(No Model.) 2 Sheets—Sheet 1.
W. F. BROWN.
CORN OR COTTON DROPPER.
No. 395,262. Patented Dec. 25, 1888.
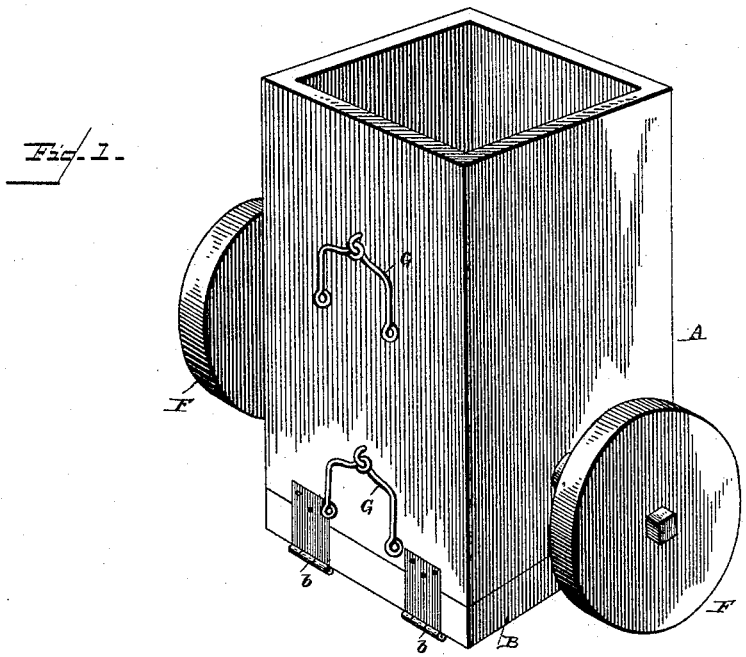
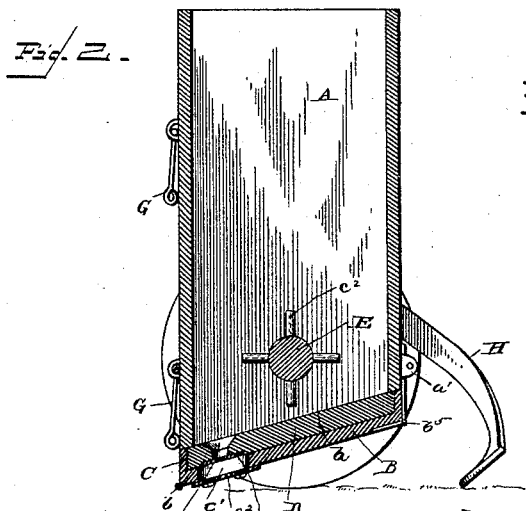
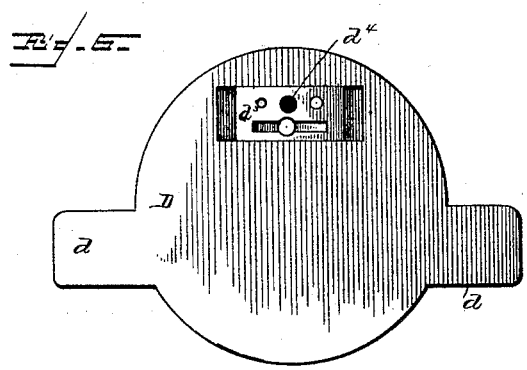
WITNESSES
Edwin L. Yewell.
Wm. J. Littell,
Wm. F. Brown,
INVENTOR
by
J. R. Littell,
Attorney (No Model.) 2 Sheets—Sheet 2.

W. F. BROWN.
CORN OR COTTON DROPPER.

No. 395,262. Patented Dec. 25, 1888.

WITNESSES
Edwin L. Yewell
Wm. J. Littell

Wm. F. Brown,
INVENTOR
by
J. R. Littell,
Attorney

United States Patent Office.

WILLIAM FRANKLIN BROWN, OF WACO, TEXAS.

CORN OR COTTON DROPPER.

SPECIFICATION forming part of Letters Patent No. 395,262, dated December 25, 1888.

Application filed May 26, 1888. Serial No. 275,171. (No model.)

*To all whom it may concern:*

Be it known that I, WILLIAM FRANKLIN BROWN, a citizen of the United States, residing at Waco, in the county of McLennan and State of Texas, have invented certain new and useful Improvements in Corn and Cotton Droppers, of which the following is a specification.

This invention relates to corn and cotton droppers, and its object is to provide a device of this character possessing advantages in point of simplicity, inexpensiveness, durability, and general efficiency.

Figure 3:
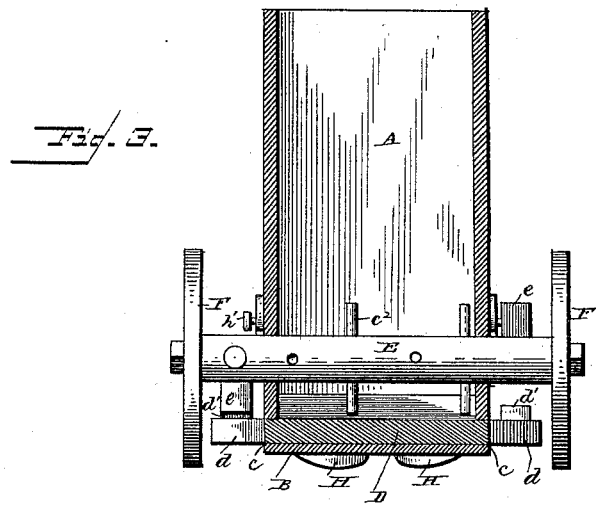
Figures 4, 8:
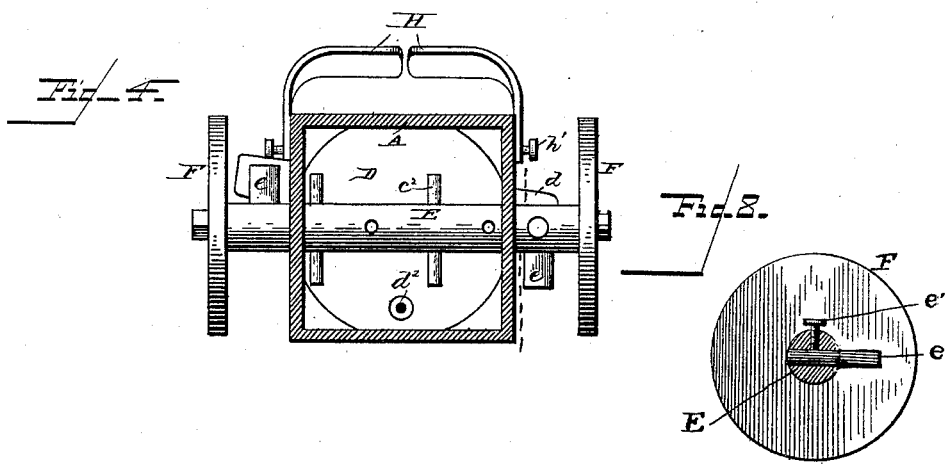
Figure 5:
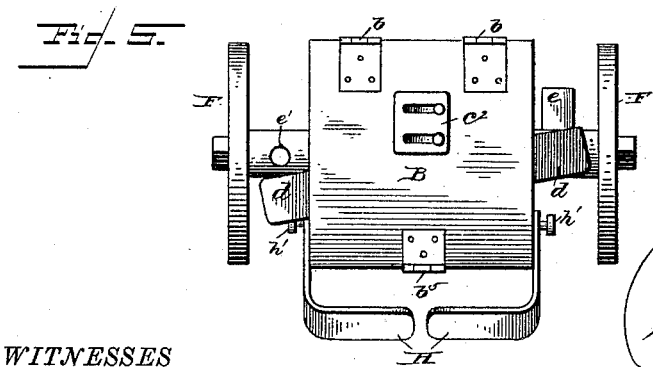

In the drawings, Figure 1 is a perspective view of a corn and cotton dropper embodying my invention. Fig. 2 is a vertical longitudinal sectional view. Fig. 3 is a vertical transverse sectional view. Fig. 4 is a horizontal sectional view. Fig. 5 is a bottom or inverted plan view. Fig. 6 is a similar view in detail of the oscillating plate. Fig. 7 is a detail perspective view of one of the hoes or coverers. Fig. 8 is a detail sectional view.

Corresponding parts in the figures are denoted by the same letters of reference.

Referring to the drawings, A designates the seed-box, preferably rectangular in shape and provided with a rearwardly-beveled lower end, $a$, which is adapted to assume a horizontal plane when the device is in position for operation. To this beveled end is secured the bottom B by hinges $b\ b$ upon one side, and upon the opposite side is provided a hinged securing-plate, $b^5$, having a slot engaging a key, $a'$, upon the box A for retaining the bottom closed. Within the top or inner surface of the bottom is provided a circular recess, C, having slots $c\ c$ at opposite sides between said recess and the exterior, and a vertical elongated slot, $c'$, forming the feed-opening, is preferably provided through the bottom within the recess. This feed-opening is adapted to be closed by a sliding plate, $c^2$, upon the under side of the bottom.

Located within the recess C and corresponding thereto is a circular oscillating disk, D, having projecting arms $d\ d$ at opposite sides and at one side the center of said disk. These arms project through the slots $c$ and are provided near their outer ends with upwardly-projecting lugs $d'\ d'$. The disk D has a feed-opening, $d^2$, near its periphery at one side, flaring at its upper edge to permit the ready passage of the seed, said feed-opening passing over the feed-opening in the bottom when the disk is oscillated.

The feed of the seed is regulated by a sliding plate, $d^3$, located within a recess in the bottom of the disk under the feed-opening, and is provided with a series of perforations, $d^4$, of different diameters, any one of which can be adjusted to coincide with the feed-opening.

The disk D is oscillated by oppositely-disposed lugs $e\ e$ upon a shaft, E, journaled in the seed-box, said shaft carrying operating-wheels F F at its ends, which rest upon the ground and revolve when the device is operated. These lugs are transversely adjustable with relation to the shaft, and are retained in adjusted position by set-screws $e'\ e'$ at one side said shaft, as clearly shown in Fig. 8, said lugs alternately engaging the lugs $d'$ to oscillate the disk. The shaft extends through the box, and within the latter it is provided with a series of agitating-pins, $c^2$, which stir the seed and prevent clogging.

G designates two approximately U-shaped clevises secured at the front side of the seed-box, each having oppositely-disposed eyes for the reception of bolts $g\ g$.

At each side the seed-box is provided a hoe or coverer, H, having an elongated slot, $h$, through which passes a set-screw, $h'$, for adjusting the plate at the desired angle. The free ends of these hoes are curved or bent in rear of the box, as shown, their opposing ends nearly meeting, said hoes being designed to cover the seed after it has been dropped.

The operation and advantages of my invention will be readily understood by those skilled in the art to which it appertains.

The device is designed to be attached to the rear of a plow by means of the clevises, and as the plow is moved forward the shaft revolves with the operating-wheels, and the lugs thereon alternately engage the lugs on the arms of the disk and oscillate the latter, thereby permitting the seed to be fed through the feed-openings in the disk and bottom, after which it is covered by the adjustable hoes.

I claim as my invention—

1. In a corn and cotton planter, the combination, with the seed-box, of a shaft passing therethrough and provided within the box with agitating-pins and upon the outside with lugs adapted to oscillate a disk within the seed-box, and operating-wheels upon the ends of said shaft, substantially as set forth.

2. In a corn and cotton planter, the combination, with the seed-box having attaching-clevises upon one side and a beveled lower end, and a bottom hinged to said end and provided with a retaining-catch, of a disk disposed in said bottom provided with lugs, and a transverse shaft journaled in said box and provided with lugs adapted to alternately engage the lugs on the disk to oscillate the latter, substantially as set forth.

3. The herein-described corn and cotton planter, comprising the seed-box having the beveled lower end provided with a bottom, a feed-opening in the latter, an oscillating disk disposed in said bottom provided with lugs, a shaft journaled in the box provided interiorly with agitating-teeth and exteriorly with lugs for alternately engaging the disk-lugs, carrying-wheels secured to the ends of the shaft, hoes, substantially as described, secured to the box, and clevises secured upon one side of the latter, substantially as and for the purpose set forth.

4. In a corn and cotton planter, the combination, with the seed-box having a hinged bottom provided with a feed-opening, of an oscillating disk located in a recess in said bottom having a feed-opening and projecting arms provided with lugs, and a shaft journaled in the seed-box provided with oppositely-disposed lugs adapted to alternately engage the lugs on the arms of the disk to oscillate the latter, substantially as set forth.

5. The herein-described corn and cotton dropper, comprising the seed-box provided with a hinged bottom having a feed-opening and a slide for closing the same, an oscillating disk disposed in a recess therefor in said bottom and provided with a feed-opening, an adjustable plate having openings of different diameters adapted to coincide with the latter feed-opening, arms projecting from the disk provided with lugs, a shaft journaled in the seed-box provided interiorly with agitating-teeth and exteriorly with lugs adapted to engage the disk-lugs to oscillate the disk, and carrying-wheels mounted at the ends of the shaft, all arranged and adapted to operate substantially as and for the purpose set forth.

6. In a corn and cotton planter, the combination, with the seed-box, of a shaft journaled therein provided with adjustable lugs adapted to oscillate a disk in the bottom of the seed-box, substantially as set forth.

In testimony whereof I affix my signature in presence of two witnesses.

WILLIAM FRANKLIN BROWN.

Witnesses:
J. R. BELL,
R. W. DAVIS.